US012681752B2

(12) United States Patent
Mizutani

(10) Patent No.: US 12,681,752 B2
(45) Date of Patent: Jul. 14, 2026

(54) INFORMATION PROCESSING DEVICE FOR PERFORMING ANALYSIS OF AN OPERATING VIRTUAL MACHINE

(71) Applicant: TOYOTA JIDOSHA KABUSHIKI KAISHA, Toyota (JP)

(72) Inventor: Taiki Mizutani, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 18/481,288

(22) Filed: Oct. 5, 2023

(65) Prior Publication Data

US 2024/0176644 A1    May 30, 2024

(30) Foreign Application Priority Data

Nov. 25, 2022    (JP) ................................. 2022-188680

(51) Int. Cl.
*G06F 9/455* (2018.01)
(52) U.S. Cl.
CPC .. *G06F 9/45558* (2013.01); *G06F 2009/4557* (2013.01); *G06F 2009/45583* (2013.01)

(58) Field of Classification Search
CPC ........... G06F 9/5558; G06F 2009/4557; G06F 2009/45583
See application file for complete search history.

(56) References Cited

U.S. PATENT DOCUMENTS

2023/0138145 A1     5/2023   Mizutani
2023/0401083 A1*  12/2023   Imamoto ............. G06F 9/45558

FOREIGN PATENT DOCUMENTS

| JP | 2020-107206 A | 7/2020 |
| JP | 2023-69058 A | 5/2023 |
| WO | WO 2022/181020 A1 | 9/2022 |

* cited by examiner

*Primary Examiner* — Wissam Rashid
(74) *Attorney, Agent, or Firm* — Oblon, McClelland, Maier & Neustadt, L.L.P.

(57) ABSTRACT
An information processing device, including: a memory; and a processor coupled to the memory, the processor being configured to: generate a first virtual machine, and a second virtual machine for analyzing the first virtual machine; allocate a portion of a predetermined resource to the generated first virtual machine; and in a case in which the second virtual machine has been generated, secure, in the predetermined resource, an allocation region allocated to the second virtual machine.

2 Claims, 6 Drawing Sheets

FIG.4

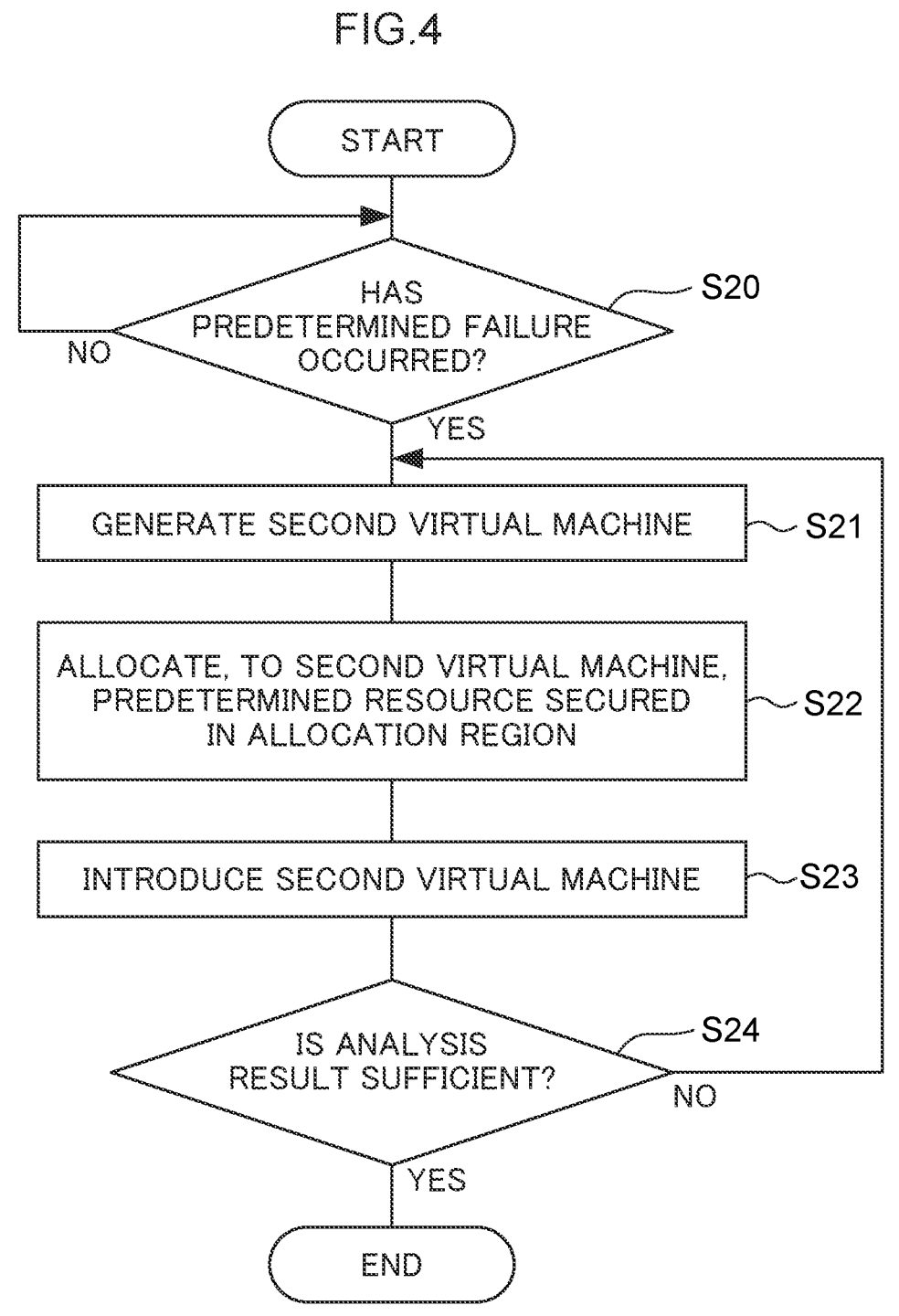

START

HAS PREDETERMINED FAILURE OCCURRED? — S20

NO

YES

GENERATE SECOND VIRTUAL MACHINE — S21

ALLOCATE, TO SECOND VIRTUAL MACHINE, PREDETERMINED RESOURCE SECURED IN ALLOCATION REGION — S22

INTRODUCE SECOND VIRTUAL MACHINE — S23

IS ANALYSIS RESULT SUFFICIENT? — S24

NO

YES

END

1

INFORMATION PROCESSING DEVICE FOR PERFORMING ANALYSIS OF AN OPERATING VIRTUAL MACHINE

CROSS-REFERENCE TO RELATED APPLICATION

This application claims priority under 35 USC 119 from Japanese Patent Application No. 2022-188680, filed on Nov. 25, 2022, the disclosure of which is incorporated by reference herein.

BACKGROUND

Technical Field

The present disclosure relates to an information processing device.

Related Art

Japanese Patent Application Laid-open (JP-A) No. 2020-107206, discloses a microcomputer that can perform debugging without preparing debugging programs.

Although the disclosure in JP-A No. 2020-107206, is to configure a virtual machine specialized in a debugging process as a debugging virtual machine, there is still room for improvement regarding techniques for analyzing defective virtual machines.

SUMMARY

The present disclosure provides an information processing device that may perform analysis in a situation in which a virtual machine that is an analysis target is operating, during the analysis, similarly to before the analysis.

A first aspect of the present disclosure is an information processing device including: a generation section capable of generating a first virtual machine, and a second virtual machine for analyzing the first virtual machine; and a control section that allocates a portion of a predetermined resource to the first virtual machine generated by the generation section and, in a case in which the second virtual machine has been generated by the generation section, that secures, in the predetermined resource, an allocation region allocated to the second virtual machine.

In the information processing device of the first aspect of the present disclosure, a generation section is capable of generating a first virtual machine, and a second virtual machine for analyzing the first virtual machine. Moreover, a control section allocates a portion of a predetermined resource to the first virtual machine generated by the generation section and, in a case in which the second virtual machine has been generated by the generation section, secures, in the predetermined resource, an allocation region allocated to the second virtual machine. This enables the information processing device to allocate an allocation region secured in the predetermined resource to the second virtual machine in a case in which the second virtual machine has been generated, and the predetermined resource allocated to the first virtual machine is not compressed. Accordingly, with this information processing device, the second virtual machine can perform analysis in a situation in which the first virtual machine that is the analysis target is operating, during the analysis, in the same manner as before the analysis.

In a second aspect of the present disclosure, in the first aspect, the generation section may generate the second virtual machine in a case in which a predetermined failure has occurred.

In the information processing device of the second aspect of the present disclosure, the generation section generates the second virtual machine, in a case in which a predetermined failure has occurred. As a result, the second virtual machine may be made to analyze predetermined failures.

In a third aspect of the present disclosure, in the second aspect, the control section may maintain an amount of the predetermined resource allocated to the first virtual machine even when the second virtual machine has been generated by the generation section.

In the information processing device of the third aspect of the present disclosure, even if the generation section has generated the second virtual machine, the control section maintains the amount of the predetermined resource allocated to the first virtual machine. As a result, a portion of the allocated predetermined resource may also be used by the first virtual machine during analysis, similarly to before the analysis.

In a fourth aspect of the present disclosure, in the third aspect, the first virtual machine and the second virtual machine may be virtual machines installed in a vehicle onboard system.

In the information processing device of the fourth aspect of the present disclosure, the first virtual machine and the second virtual machine are virtual machines installed in a vehicle onboard system. As a result, the second virtual machine may perform analysis while ensuring real-time performance of the onboard system by utilizing the same resources for the first virtual machine before analysis and during analysis.

In a fifth aspect of the present disclosure, in any one of the first aspect to the fourth aspect, in a case in which an analysis result of analysis of the first virtual machine by the second virtual machine is insufficient, the generation section may generates a new second virtual machine based on the analysis result.

In the information processing device of the fifth aspect of the present disclosure, in a case in which an analysis result of analysis of the first virtual machine by the second virtual machine is insufficient, the generation section generates a new second virtual machine based on the analysis result. As a result, the analysis performed by the second virtual machine may be continued until the analysis result is sufficient.

According to the above aspects, the information processing device of the present disclosure may perform analysis in a situation in which the virtual machine that is the analysis target is operating, during the analysis, in the same manner as before the analysis.

BRIEF DESCRIPTION OF THE DRAWINGS

Exemplary embodiments will be described in detail based on the following figures, wherein:

FIG. 4 is a flowchart illustrating a flow of second processing performed by a central ECU;

DETAILED DESCRIPTION

Figure 1:
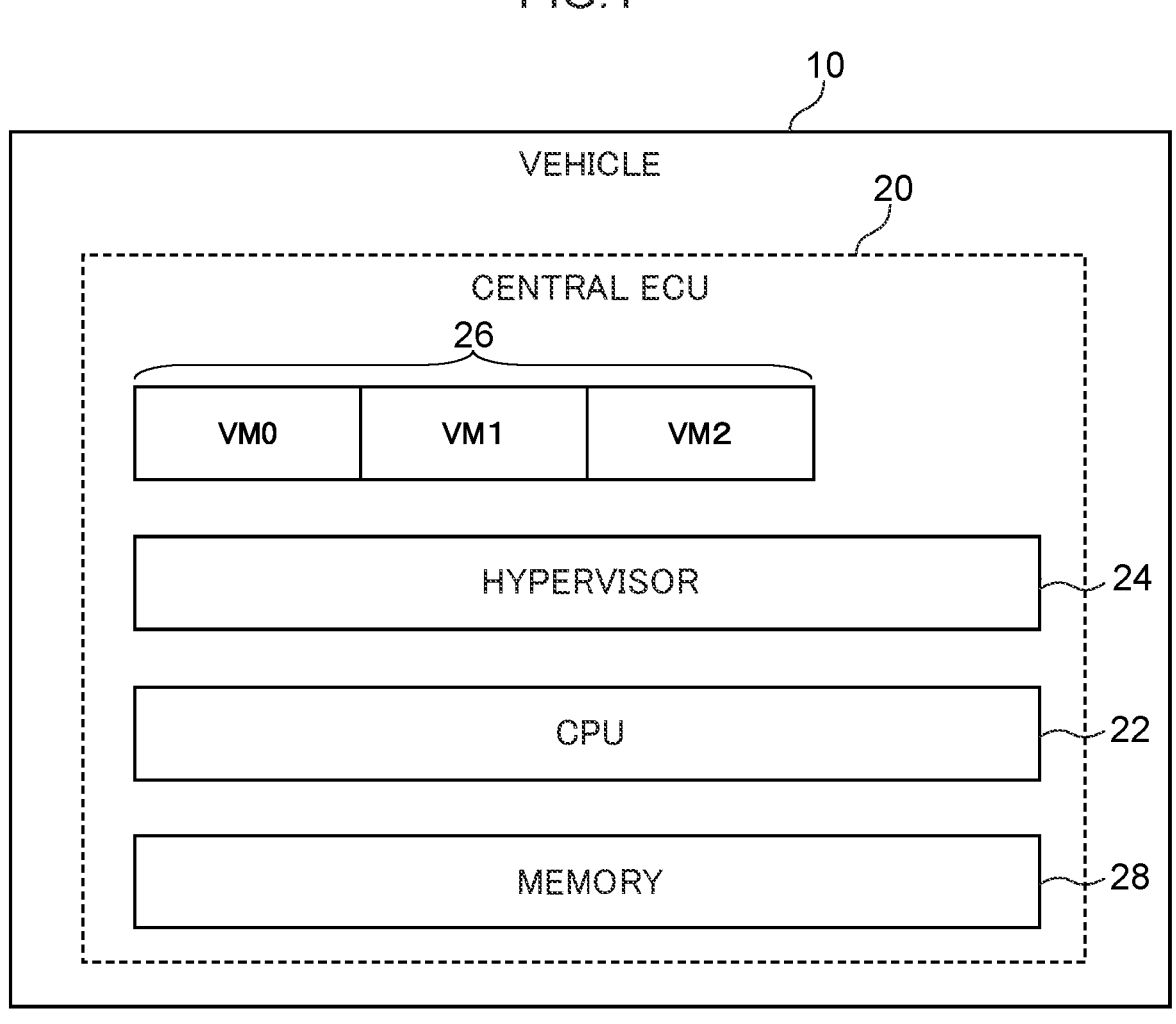
FIG. 1 is a block diagram illustrating a schematic configuration of a vehicle according to the present embodiment.

Explanation follows regarding a vehicle 10 according to the present embodiment, with reference to the drawings. FIG. 1 is a block diagram illustrating a schematic configuration of a vehicle 10 according to the present embodiment.

As illustrated in FIG. 1, the vehicle 10 includes a central electronic control section (ECU) 20. The central ECU 20 is an example of an information processing device.

The central ECU 20 is an ECU that integrally controls various ECUs provided in the vehicle 10. The central ECU 20 includes a central processing section (CPU) 22 and a hypervisor 24. The central ECU 20 includes other configurations, such as memory 28 including: read only memory (ROM), random access memory (RAM), and storage.

The CPU 22 is a central processing section that executes various programs and controls various sections. Namely, the CPU 22 reads a program from the ROM or the storage, and executes the program using the RAM as a workspace.

The hypervisor 24 is software for virtualizing a computer. The hypervisor 24 virtualizes the CPU 22 to generate a virtual machine (VM) 26. In the present exemplary embodiment, the hypervisor 24 generates plural VMs 26. FIG. 1 illustrates an example in which three VMs (VM 0, VM 1, and VM 2) are generated by the hypervisor 24 as the plural VMs 26.

Moreover, the hypervisor 24 allocates predetermined resources to the respective VMs 26, enabling the respective VMs 26 to appear to be operating in parallel. The predetermined resources include resources and storage resources of the CPU 22. The resources of the CPU 22 are, for example, allocated CPU time. The storage resources are, for example, the capacity and the upper limit number of rewrites to the storage.

Figure 2:
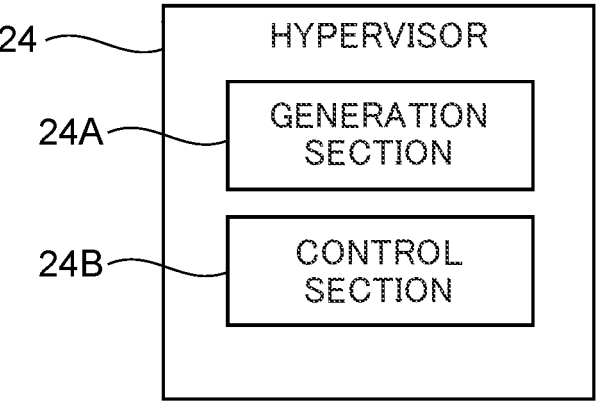
FIG. 2 is a block diagram illustrating functional configuration of a hypervisor according to the present embodiment.

Next, explanation follows regarding functional configuration of the hypervisor 24. FIG. 2 is a block diagram illustrating functional configuration of the hypervisor 24 according to the present exemplary embodiment.

As illustrated in FIG. 2, the hypervisor 24 has the functionality of a generation section 24A and a control section 24B.

The generation section 24A is capable of generating plural VMs 26. More specifically, the generation section 24A is capable of generating, as the plural VMs 26, a first virtual machine that is an analysis target and a second virtual machine for analyzing the first virtual machine. The first virtual machine and the second virtual machine are virtual machines installed in an onboard system of the vehicle 10. The first virtual machine is, for example, a body control virtual machine, an engine control virtual machine, an autonomous driving control virtual machine, or the like. Note that, the first virtual machine implemented by the central ECU 20 is not limited to this configuration, and may be a virtual machine suitable for another use.

The generation section 24A generates the second virtual machine in a case in which a predetermined failure has arisen. More specifically, the generation section 24A generates the second virtual machine on the assumption that a predetermined failure has arisen; for example, in a case in which predetermined information has been acquired or a case in which a predetermined operation has been accepted. For example, as predetermined information, the generation section 24A may generate the second virtual machine in a case in which the occurrence of a case of failure by a virtual machine of the same type as the first virtual machine generated by the generation section 24A has been acquired from an external device over a network. Alternatively, the generation section 24A may generate the second virtual machine in a case in which fault information indicating a fault in a predetermined component of the vehicle 10 is acquired as predetermined information. The fault information is, for example, a diagnostic code. The generation section 24A then generates a unique second virtual machine according to the content of the failure that has occurred; for example, according to the acquired diagnostic code.

Moreover, in a case in which the analysis result of analysis of the first virtual machine by the second virtual machine is insufficient, the generation section 24A generates a new second virtual machine based on the analysis result. More specifically, in cases in which a failure is not identified or a predetermined operation is accepted even after a predetermined period of time has elapsed from the start of analysis, the new second virtual machine is generated on the assumption that the analysis result was insufficient. For example, in a case in which the generation section 24A generates the second virtual machine corresponding to a first diagnostic code, but the analysis result of the second virtual machine is insufficient, a new second virtual machine is generated in response to another diagnostic code, such as a second or third diagnostic code.

The control section 24B allocates a portion of the predetermined resource to the first virtual machine generated by the generation section 24A. For example, the control section 24B allocates CPU time for each major time frame to the first virtual machine as a resource of the CPU 22. Moreover, the control section 24B allocates a portion of the capacity of the storage to the first virtual machine as a storage resource.

Moreover, in a case in which the generation section 24A has generated the second virtual machine, the control section 24B secures an allocation region allocated to the second virtual machine as a predetermined resource. For example, the control section 24B secures an allocation region corresponding to the allocated CPU time, allocated to the second virtual machine for each major time frame, and secures an allocation region corresponding to the capacity allocated to the second virtual machine in the storage.

Even if the generation section 24A generates the second virtual machine, the control section 24B maintains the predetermined amount of resources allocated to the first virtual machine.

Figure 3:
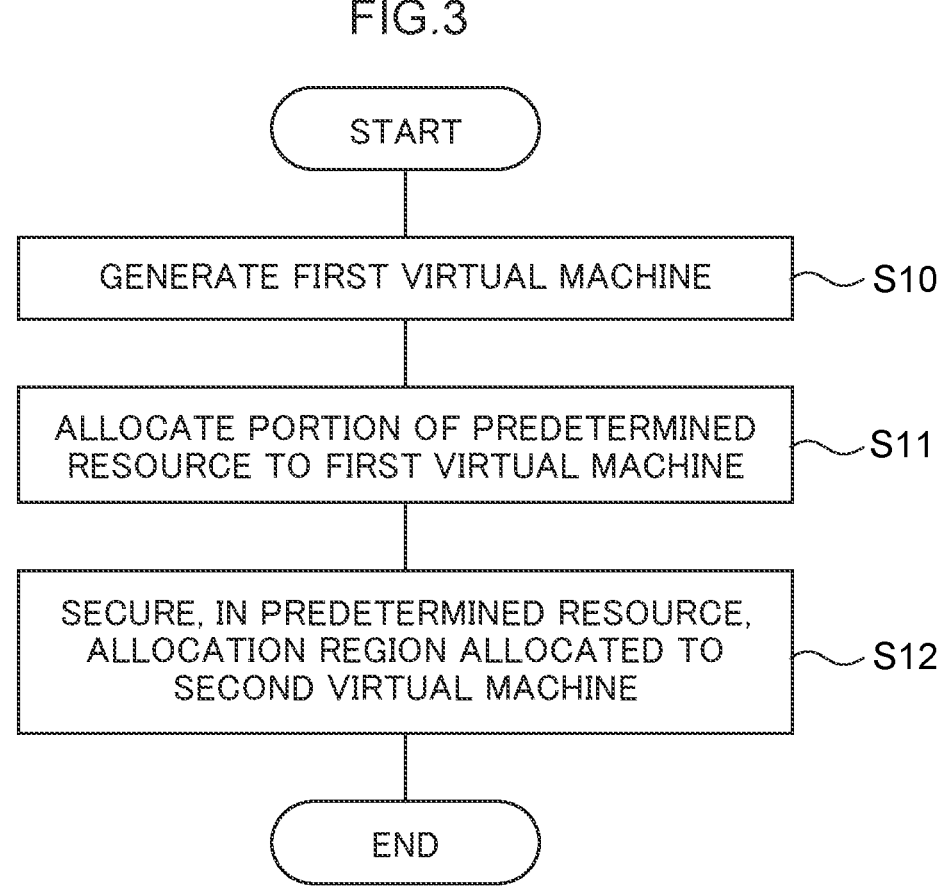
FIG. 3 is a flowchart illustrating a flow of first processing performed by a central ECU.

FIG. 3 is a flowchart illustrating a flow of first processing performed by the central ECU 20. Note that the processing illustrated in FIG. 3 is performed, for example, during product development of the vehicle 10.

At step S10 illustrated in FIG. 3, the hypervisor 24 generates a first virtual machine. Then, the hypervisor 24 proceeds to step S11. As an example, the hypervisor 24 may generate plural first virtual machines.

At step S11, the hypervisor 24 allocates a portion of a predetermined resource to the first virtual machines generated at step S10. Then, the hypervisor 24 proceeds to step S12.

At step S12, in a case in which the hypervisor 24 has generated the second virtual machine, secures an allocation region allocated to the second virtual machine in the predetermined resource. Then, the hypervisor 24 ends the processing of FIG. 3.

FIG. 4 is a flowchart illustrating a flow of second processing performed by the central ECU 20. Note that, the processing illustrated in FIG. 4 is performed in a case in which a non-illustrated ignition switch or the like is operated to turn ON the power of the vehicle 10.

In a case in which a predetermined failure has arisen at step S20 illustrated in FIG. 4 (step S20: YES), the hypervisor 24 proceeds to step S21. On the other hand, in cases in which no predetermined failure has arisen (step S20: NO), the hypervisor 24 waits until a predetermined failure has arisen.

At step S21, the hypervisor 24 generates a second virtual machine. Then, the hypervisor 24 proceeds to step S22.

At step S22, the hypervisor 24 allocates the predetermined resource, secured in the allocation region at step S12 in FIG. 3, to the second virtual machine. Then, the hypervisor 24 proceeds to step S23.

At step S23, the hypervisor 24 introduces the second virtual machine, generated at step S21, to the VM 26. As a result, the VM 26 is configured by the first virtual machine and the second virtual machine. Then, the hypervisor 24 proceeds to step S24. As an example, the hypervisor 24 introduces a second virtual machine into the VM 26 by reprogramming. Moreover, the hypervisor 24 applies access rights to access to the first virtual machine, which is the analysis target, to the second virtual machine installed in the VM 26.

In a case in which the analysis result of analysis of the first virtual machine by the second virtual machine is sufficient (step S24: YES), the hypervisor 24 ends the processing of FIG. 4. On the other hand, in cases in which the analysis result is insufficient (step S24: NO), the hypervisor 24 returns to step S21.

When the processing of FIG. 4 has been ended, the failure is corrected based on the analysis result by the second virtual machine. Note that correction of this failure may be performed manually, or automatically by the central ECU 20 or the like.

When processing returns from step S24 to step S21, at step S21, the hypervisor 24 deletes the second virtual machine generated immediately previously, and generates a new second virtual machine based on the analysis result.

Next, explanation follows regarding an example of allocation of predetermined resources to the VM 26 before and after generation of the second virtual machine. Explanation follows regarding an example of allocated CPU time as a predetermined resource.

Figure 5:
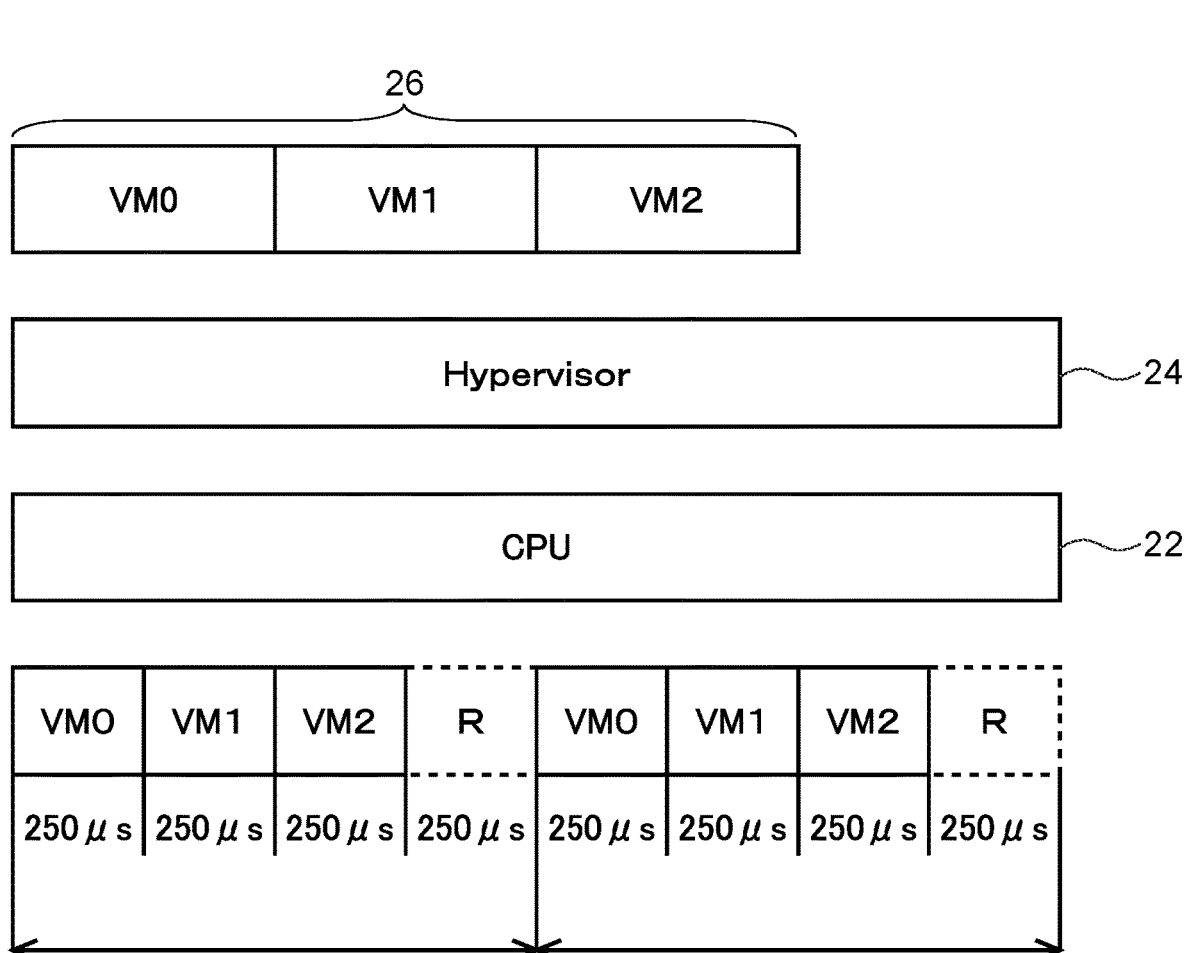
FIG. 5 is a diagram illustrating an example of allocated CPU time to each VM prior to generation of a second virtual machine.

FIG. 5 is a diagram illustrating an example of allocated CPU time to the VM 26, prior to generation of the second virtual machine. Note that in FIG. 5, the major time frame is 1000 µs.

In FIG. 5, three first virtual machines, VM 0, VM 1, and VM 2, are generated by the hypervisor 24 as the plural VMs 26. In FIG. 5, in each major time frame, 250 µs is allocated as allocated CPU time to each of the three first virtual machines, VM 0, VM 1, and VM 2.

Moreover, in FIG. 5, an allocation region R allocated to the second virtual machine is secured for each major time frame. The allocated region R is the region indicated by broken lines in the drawings. The allocated CPU time of "250 µs" is secured by subtracting "750 µs" allocated to the first virtual machine from the major time frame "1000 µs".

Figure 6:
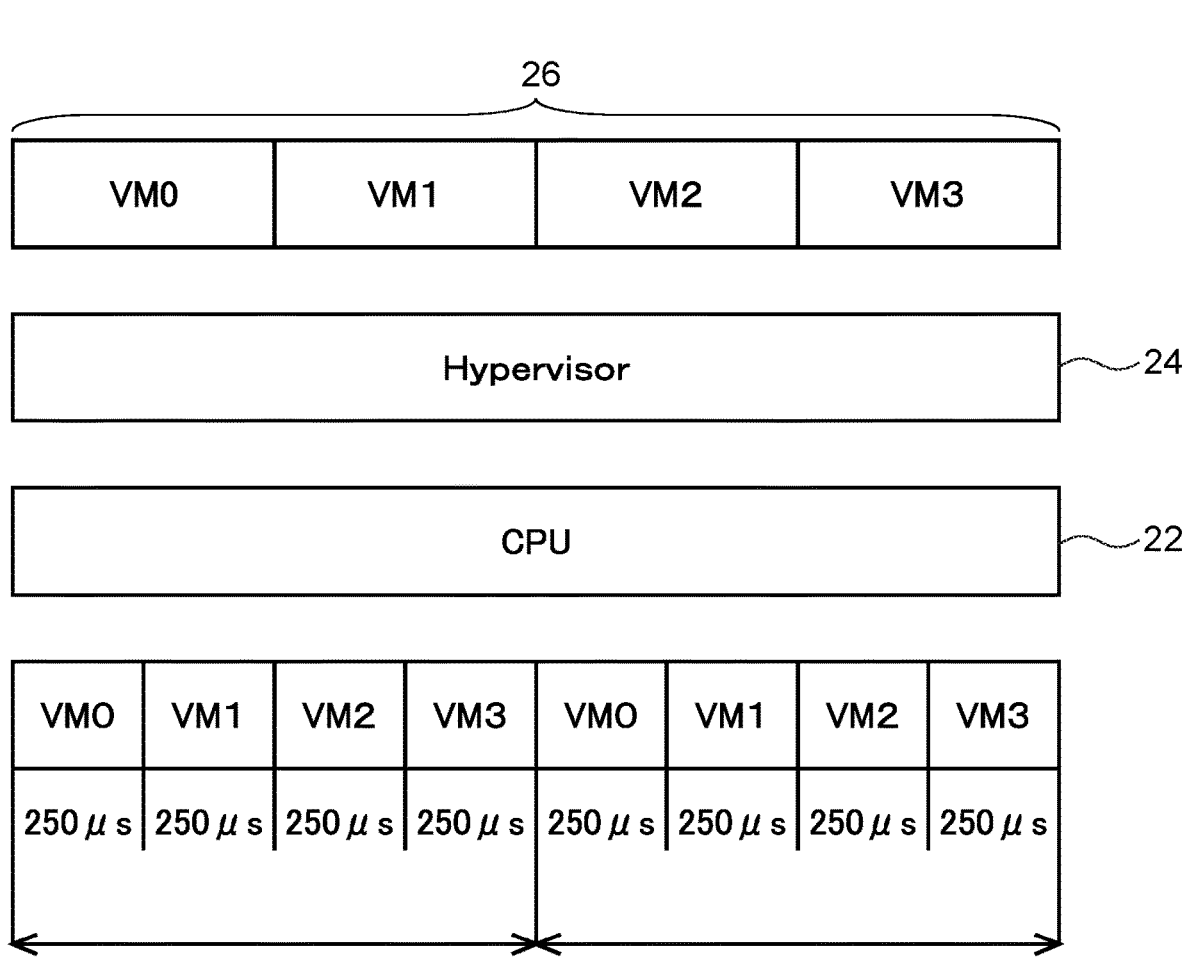
FIG. 6 is a diagram illustrating an example of allocated CPU time to each VM after generation of a second virtual machine.

FIG. 6 is a diagram illustrating an example of allocated CPU time to the VM 26, after generation of the second virtual machine.

In FIG. 6, a VM 3, which is a second virtual machine, is generated by the hypervisor 24, and configures the plural VMs 26 together with the VM 0, VM 1, and VM 2. In FIG. 6, similarly to before the generation of the second virtual machine, in each major time frame, 250 µs is allocated as allocated CPU time to each of the three first virtual machines, VM 0, VM 1, and VM 2.

Moreover, in FIG. 6, allocated CPU time of 250 µs secured in the allocation region R (see FIG. 5) prior to generation of the corresponding VM 3, is allocated to the VM 3 configuring the second virtual machine. The VM 3 then executes analysis processing to analyze the first virtual machine during the allocated CPU time. This analysis processing includes: processing to prepare for analysis by reading predetermined data from a first virtual machine or writing predetermined data to a first virtual machine; and processing to actually perform analysis by analyzing read data or monitoring operation of the first virtual machine into which data has been written.

As described above, in the central ECU 20 according to the present exemplary embodiment, the hypervisor 24 is capable of generating a first virtual machine and a second virtual machine for analyzing the first virtual machine. Further, the hypervisor 24 allocates a portion of the predetermined resource to the generated first virtual machine, and in a case in which the second virtual machine has been generated, the allocation region allocated to the second virtual machine is secured in the predetermined resource. This enables the central ECU 20 to allocate an allocation region secured in a predetermined resource to the second virtual machine, in a case in which the second virtual machine has been generated, and the predetermined resource allocated to the first virtual machine is not compressed. This enables the central ECU 20 to cause the second virtual machine to perform analysis in a situation in which the first virtual machine that is the analysis target is operating during analysis in the same manner as before the analysis.

Moreover, in the central ECU 20 according to the present exemplary embodiment, the hypervisor 24 generates the second virtual machine in a case in which a predetermined failure has occurred. This enables the central ECU 20 to cause the second virtual machine to analyze predetermined failures. Moreover, the central ECU 20 generates a second virtual machine in a case in which a predetermined failure has occurred, whereby the second virtual machine can be made to perform flexible analysis in accordance with the failure.

Moreover, in the central ECU 20 according to the present exemplary embodiment, even if the hypervisor 24 generates the second virtual machine, the hypervisor 24 maintains the predetermined amount of resources allocated to the first virtual machine. Moreover, since all information such as codes required for analysis is arranged in the second virtual machine, there is no need to change the program of the first virtual machine. These separation functionalities of the hypervisor 24 enable, in the central ECU 20, a portion of the allocated predetermined resource to also be used by the first virtual machine during analysis, similarly to before the analysis.

Moreover, in the central ECU 20 according to the present exemplary embodiment, the first virtual machine and the second virtual machine are virtual machines installed in a vehicle onboard system. As a result, in the central ECU 20, the second virtual machine can perform analysis while ensuring real-time performance of the onboard system, by utilizing the same resources for the first virtual machine before analysis and during analysis. Note that it is desirable that the failure analysis of the onboard system be performed without changing the operation of the analysis target before or during the analysis, and that the analysis be performed in the same circumstances as those in which the failure has occurred. In this respect, with the above configuration of the central ECU 20, the second virtual machine can perform the analysis in a situation in which the first virtual machine that is the analysis target is operating in the same manner as before the analysis, during the failure analysis of the onboard system.

Moreover, in the central ECU 20 according to the present exemplary embodiment, in a case in which the analysis result of analysis of the first virtual machine by the second virtual machine is insufficient, a new second virtual machine is generated in consideration of the analysis result. This enables the central ECU 20 to continue the analysis using the second virtual machine until the analysis result is sufficient.

In the above exemplary embodiment, in each major time frame, the same CPU time is allocated to each of the three first virtual machines, VM 0, VM 1, and VM 2. However, there is no limitation thereto, and the CPU time allocated to each of the plural first virtual machines may be different.

In the above exemplary embodiment, the same CPU time is allocated to each first virtual machine and the second virtual machine in each major time frame. However, there is no limitation thereto, and the CPU time allocated to each of the first virtual machines and the second virtual machine may be different.

In the above exemplary embodiment, each allocation region R is secured in each major time frame, after each allocated CPU time, allocated to the first virtual machine. However, there are no limitation to the locations in which the allocated region R is secured. The allocated region R can be secured at any given location, such as before the allocated CPU time allocated to each first virtual machine or between the allocated CPU time, allocated to each first virtual machine.

In the above exemplary embodiment, as an example of analysis processing performed by the second virtual machine, predetermined data is read from the first virtual machine or predetermined data is written to the first virtual machine. However, the analysis processing is not limited to this, and various kinds of processing based on the access authority allocated to the second virtual machine can be performed.

A program for executing processing performed by the hypervisor 24 in the above exemplary embodiment may be stored (installed) in advance in a ROM or storage of the central ECU 20, or may be provided in a format recorded on a recording medium such as compact disc read only memory (CD-ROM), digital versatile disc read only memory (DVD-ROM), or universal serial bus (USB) memory. Alternatively, the above program may be provided in a format download-able from an external device over a network.

What is claimed is:

1. An information processing device, comprising:
a memory; and
a processor coupled to the memory,
wherein the processor is configured to:
generate a first virtual machine, and a second virtual machine for analyzing the first virtual machine, the first virtual machine and the second virtual machine being virtual machines installed in a vehicle onboard system;

allocate a portion of a predetermined resource includ-ing CPU resources and storage resources to the generated first virtual machine;

in a case in which the second virtual machine has been generated, secure, in the predetermined resource, an allocation region allocated to the second virtual machine;

in a case in which a diagnostic code indicating a failure of a predetermined component of a vehicle has been acquired, determine that a predetermined failure has occurred and generate a unique second virtual machine corresponding to the acquired diagnostic code;

in a case in which a failure has not been identified even after a predetermined period of time has elapsed since an analysis started, determine that an analysis result, obtained by the second virtual machine cor-responding to a first diagnostic code analyzing the first virtual machine, is insufficient, delete the second virtual machine generated immediately before, and generate, based on the analysis result, a new second virtual machine corresponding to another second or third diagnostic code;

maintain an amount of the predetermined resource allocated to the first virtual machine even when the second virtual machine has been generated;

as the CPU resources, allocate to the first virtual machine a CPU allocation time for each major time frame that is a preset cycle time unit, and as the storage resources, allocate to the first virtual machine a portion of a storage capacity; and in a case in which the second virtual machine has been generated, secure, for each major time frame, the allocation region corresponding to the CPU alloca-tion time allocated to the second virtual machine, and secure, in the storage, the allocation region corresponding to a capacity allocated to the second virtual machine, wherein the second virtual machine, during the allocated CPU allocation time, performs, as analysis processing for analyzing the first virtual machine, processing for preparation for analysis including read-ing predetermined data from the first virtual machine and writing predetermined data to the first virtual machine, processing for actually performing analysis including analyzing the read data and monitoring an operation of the first virtual machine to which the data has been written, and processing based on access rights applied to the second virtual machine.

2. The information processing device of claim 1, wherein the processor is further configured to:

generate a plurality of first virtual machines, wherein the plurality of first virtual machines are a body control virtual machine, an engine control virtual machine, and an autonomous driving control virtual machine; and apply, to the second virtual machine, the access rights to access the first virtual machine to be analyzed among the plurality of first virtual machines.

* * * * *